US010751848B2

(12) United States Patent
Boswell

(10) Patent No.: US 10,751,848 B2
(45) Date of Patent: Aug. 25, 2020

(54) DUST EXTRACTION ATTACHMENT FOR ROTARY TOOL

(71) Applicant: Jesse Boswell, Mesa, AZ (US)

(72) Inventor: Jesse Boswell, Mesa, AZ (US)

( * ) Notice: Subject to any disclaimer, the term of this patent is extended or adjusted under 35 U.S.C. 154(b) by 268 days.

(21) Appl. No.: 15/798,037

(22) Filed: Oct. 30, 2017

(65) Prior Publication Data
US 2018/0117723 A1 May 3, 2018

Related U.S. Application Data

(60) Provisional application No. 62/414,766, filed on Oct. 30, 2016.

(51) Int. Cl.
B23Q 11/00 (2006.01)
B25D 17/20 (2006.01)

(52) U.S. Cl.
CPC .......... B23Q 11/0046 (2013.01); B25D 17/20 (2013.01); B25D 2217/0065 (2013.01); B25D 2222/03 (2013.01); B25D 2222/72 (2013.01)

(58) Field of Classification Search
CPC ............ B23Q 11/0046; B23Q 11/0071; B25D 2222/03; B25D 2222/72; B25D 17/20; B25D 2217/0065; B23D 59/006
See application file for complete search history.

(56) References Cited

U.S. PATENT DOCUMENTS

| | | | |
|---|---|---|---|
| 3,442,337 A | 5/1969 | Osten | |
| 5,125,190 A * | 6/1992 | Buser | B24B 55/102 451/359 |
| 5,228,244 A | 7/1993 | Chu | |
| 5,440,809 A | 9/1995 | Padilla | |
| 5,791,979 A * | 8/1998 | Duncan | B24B 55/102 451/359 |
| 5,833,524 A | 11/1998 | Satoh et al. | |
| 6,079,078 A * | 6/2000 | Byington | B23Q 11/0046 144/252.1 |
| 6,514,131 B1 | 2/2003 | Reich et al. | |
| 6,641,634 B2 | 11/2003 | Reich et al. | |
| 6,854,937 B1 * | 2/2005 | Weiss | B23Q 11/0046 144/136.95 |
| 7,281,886 B2 | 10/2007 | Stoerig | |
| 7,510,356 B2 * | 3/2009 | Colon | B23B 51/12 408/1 R |
| 7,740,086 B2 * | 6/2010 | Bleicher | B25D 17/20 173/198 |
| 7,797,794 B2 | 9/2010 | Bleicher et al. | |
| 8,578,554 B2 | 11/2013 | King | |
| 8,793,835 B2 | 8/2014 | King | |
| 2005/0089380 A1 * | 4/2005 | Stoerig | B23Q 11/0046 408/67 |

(Continued)

Primary Examiner — Andrew M Tecco
Assistant Examiner — Nicholas E Igbokwe
(74) Attorney, Agent, or Firm — Michael Carton

(57) ABSTRACT

A dust and debris extraction device for the purpose of capturing dust and debris created by a chisel held by a power tool has an opening for a chisel to pass through at the front and is guided upward by a sleeve that passes out the top of the body of the device. The extraction end of the device has a locking mechanism to keep a hose going to a negative air source attached. The dust and debris extraction device may either free float on the shank of the chisel or be fixed to the power tool with a bracket.

15 Claims, 8 Drawing Sheets

(56) References Cited

U.S. PATENT DOCUMENTS

| | | | |
|---|---|---|---|
| 2007/0065242 A1* | 3/2007 | Skradski | B23Q 11/0046 |
| | | | 408/67 |
| 2007/0193759 A1 | 8/2007 | Sweig et al. | |
| 2007/0264092 A1* | 11/2007 | Kesten | B23Q 11/0046 |
| | | | 408/67 |
| 2013/0087357 A1* | 4/2013 | King, Jr. | B23Q 11/0046 |
| | | | 173/199 |
| 2013/0137348 A1* | 5/2013 | Chen | B24B 23/028 |
| | | | 451/453 |
| 2013/0213683 A1* | 8/2013 | Brewster | B23Q 11/00 |
| | | | 173/198 |
| 2014/0037392 A1* | 2/2014 | Lo | B23Q 11/0071 |
| | | | 408/67 |
| 2014/0138114 A1* | 5/2014 | Takeuchi | B23Q 11/0046 |
| | | | 173/198 |
| 2015/0059542 A1* | 3/2015 | Buser | A47L 1/00 |
| | | | 83/24 |

\* cited by examiner

DUST EXTRACTION ATTACHMENT FOR ROTARY TOOL

CROSS-REFERENCE TO RELATED APPLICATIONS

This application claims priority to U.S. Provisional Application Ser. No. 62/414,766 filed on Oct. 30, 2016, the entire contents of which are expressly incorporated by reference herein.

BACKGROUND OF INVENTION

Field of the Invention

This invention is related to the field of dust and debris extraction. More specifically, the invention is related to attachment devices for demolition tools that extract dust and debris.

Description of the Related Art

The practice of chipping, chiseling, scaling/, and scraping up various old debris like tile, mortar, and old coatings from concrete, brick, wood and other substrates in order to clean up the surface is well known. One existing problem is that there is a substantial amount of dust created during the aforementioned process. The dust created from broken tile, mortar, and other cementous products becomes airborne and is a known health hazard. For this reason, costly and time consuming precautions are commonly taken such as respirators, draping off work area, positive air pressure in the work area, and the like.

Known in the art are devices that work in unison with demolition tools to collect dust. One known problem with these known devices is that they only provide dust extraction directed to the area the chisel strikes, no incidental dust from debris sliding and landing to the sides or behind the chisel is collected.

Another problem with existing solutions is that the solution is not interchangeable between power tools, i.e. different chipping hammers. These known devices are purpose-built and designed for specific tools, thereby requiring a separate dust mitigation solution for each chipping hammer.

Additionally, these known solutions can be a burden to work with, resulting in the user of the device not using the power tool correctly. Due to the design and method of attachment of current devices, the device will need to be removed and re-installed several times in a day simply to lubricate the chisel.

Yet another known solution implements a positive pressure, i.e., an exhaust from the solution, with the shaft/housing of the demolition tool. This method of attachment draws dust into the demolition tool thereby causing damage to the demolition tool.

Another solution provides attaches a suction hose to the demolition tool, but the hose typically becomes easily dislodged from the demolition tool, thereby failing to sufficiently extract the dust for a period of time.

Some solutions to this problem incorporate multiple chambers for thin debris, like sheet vinyl and fabric crack isolation membranes. This thin debris often becomes trapped and stuck within the extraction device thereby requiring downtime to disassemble the device and dislodge the debris.

Lastly, some known solutions are very large and block the user's view, making it difficult to properly operate the demolition tool.

What is therefore needed is an attachment device for extracting dust and debris from the general work area of a demolition tool. What is also needed is a sturdy attachment for said device. Another need is for the attachment device to be effective, yet small enough to not block the field of view for an operator.

SUMMARY OF THE INVENTION

A dust and debris extraction device is hereby disclosed that may be attached to a machining device such as a rotary hammer and a chipping hammer. The extraction device includes a body with an internal cavity extending along a central axis of the body. A sleeve attaches to the body at an angle other than normal to the central axis and is configured to receive a machining tool such as a chisel. An extraction end on the body is configured for attachment to a suction device, such as a vacuum hose, in fluid communication with the internal cavity. A suction end on the body, opposite the extraction end, has a plurality of suction port openings. The machining tool extends through the sleeve and into the central axis of the body thereby exiting the body at the suction end.

A shroud may be attached to an exterior of the suction end with removable fasteners. The shroud is capable of contacting the machining tool as the machining tool moves within the sleeve during operation. Similarly, a wear plate may be attached to an interior of the suction end, within the internal cavity, with removable fasteners. The wear plate is capable of contacting the machining tool as the machining tool reciprocates within the sleeve during operation. A webbing may be provided within the body thereby joining the sleeve to the internal cavity and adding structural support.

The debris extraction device free floats on a shank of the machining tool as it is reciprocated by the machining device. Preferably, the debris extraction device is not connected to the machining device but is free-floating on the shank of the machining tool. wherein the sleeve extends into the internal cavity and extends from the body, outside of the internal cavity. While the debris extraction device free floats on the shank of the machining tool, a spring may be provided between the body and the machining device. The spring maintains the body at a predetermined distance apart from the machining device and also provides a cushion to hard blows dealt to the debris extraction device during operation.

A quick-connect fastener on the extraction end may be configured for attachment to the suction device, thereby making easier to remove the debris extraction device from the suction device. A suction hose with a quick-connect fastener configured for attachment to the quick-connect fastener on the extraction end may further facilitate removal and attachment of the debris extraction device to the suction device. The suction hose may extend from the debris extraction device below the machining device, thereby providing an unobstructed view of the machining tool, when the machining device is in in use on a horizontal, level floor.

According to other embodiments of the present invention, a dust extraction device, connected to a negative air (vacuum) source, slides onto a chisel and collects the dust created from the impact of the chisel against a material, the front area of the device is shaped similar to a cut diamond stone, meaning there are differently angled plates connected to each other and form the beginning/front area of the device, the angled plates may have holes/slots/openings for dust intake that enable the collection of dust created, not only from the impact of the chisel, but from the debris landing to the sides of the device, below the device and behind the device, the front area continues into a hollow tube/exhaust which the vacuum hose is connected and locked into, a sleeve that guides the chisel through the device is attached to the hollow tube or exhaust at an angle that allows the chisel to slide in from the front area angled up to the sleeve but the chisel does not pass entirely through the sleeve. In some embodiments of the invention this is all that is needed to hold the device in place.

In other embodiments of the invention the device attaches to the collar or shaft of a power tool to keep the device from rotating but does not block the user from releasing the chisel. In all cases, the dust and small debris is extracted and exhausted directly to the vacuum passing through one chamber.

According to some embodiments, a dust extraction device can be a hollow tube with an opening expanded, shrunk or same size as hollow tube, there is one body with or without an enclosed chamber, a venturi design can be added to the inside of the body but is not required, multiple dust extraction holes can be added to areas throughout and in any location on the hollow tube to extract dust from landing debris to the sides, above and behind the chisel and dust extraction device, the sleeve that holds the device to the chisel comes through the hollow tube or exhaust at an angle that allows the chisel to slide in from the front area angled up to the sleeve but the chisel does not pass entirely through the sleeve. The sleeve can lock the device in place to the chisel, "float" on the chisel, or have an addition stabilizing bracket that extends up to the power tool holding the device in place.

According to some embodiments, the device may have other attachments such as a handle or a chip deflector.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF INVENTION

Figure 1:
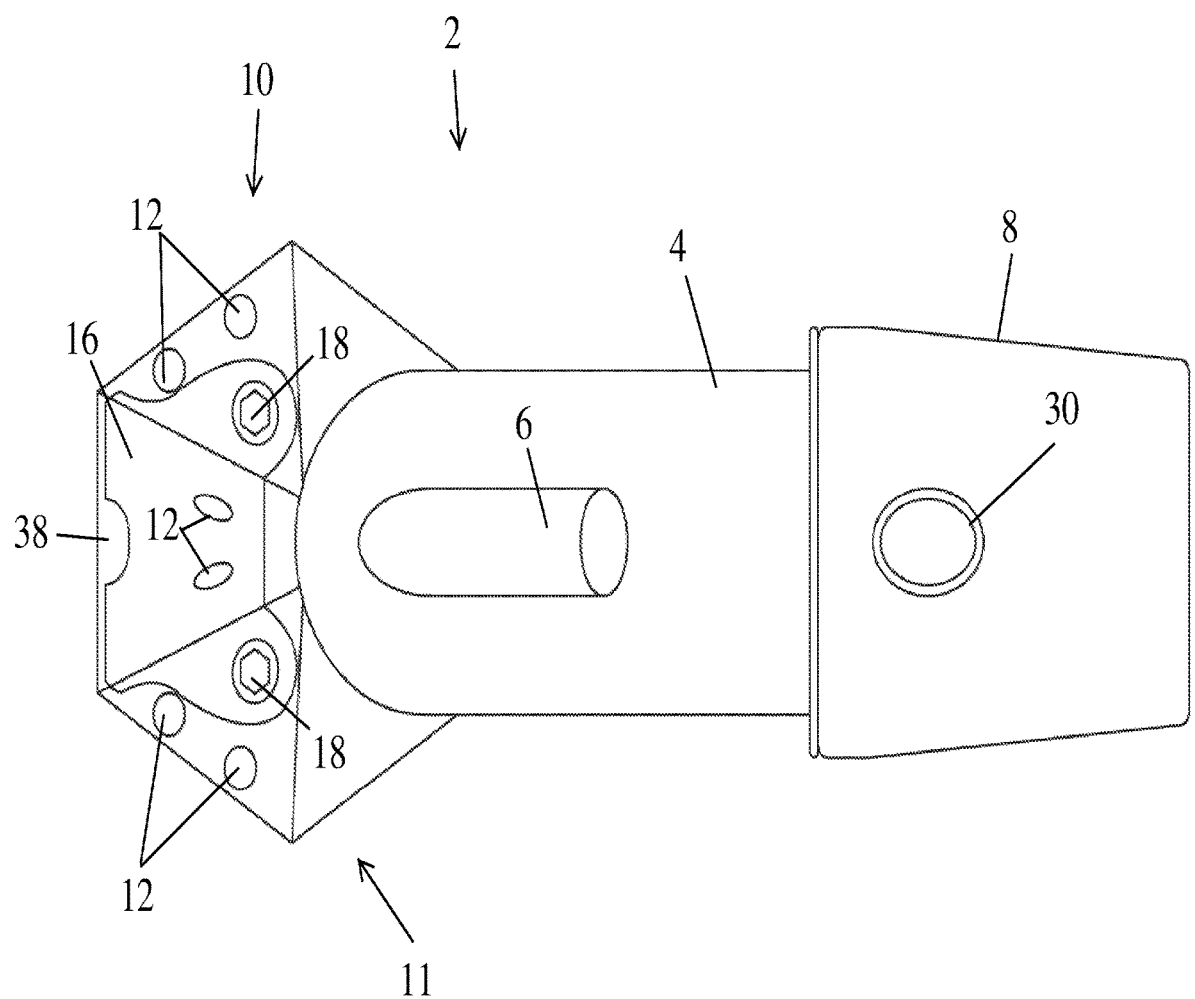
FIG. 1 shows a top view of a debris extraction device according to one embodiment of the invention.
Figure 2:
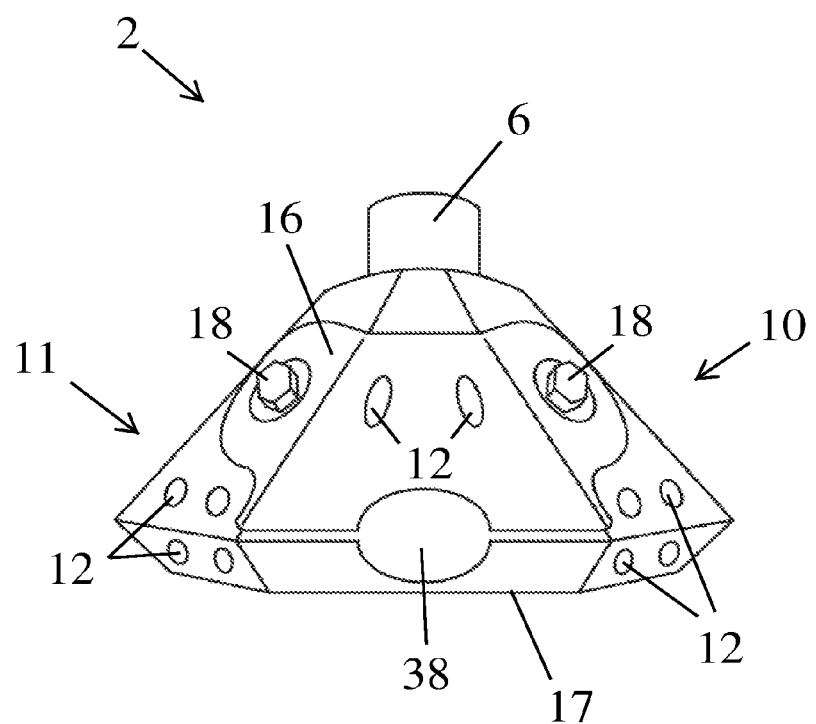
FIG. 2 shows a front view of the debris extraction device of FIG. 1.

The debris extraction device 2 is shown in FIGS. 1 and 2. The debris extraction device 2 removes both airborne dust and small debris in the vicinity of the port openings 12 on the suction end 10. The dust and debris is created by a machining tool that reciprocates and vibrates. This machining tool is placed through a sleeve 6 in the body 4 of the debris extraction device 2. The sleeve 6 supports the machining tool and a chisel end of the machining tool exits the debris extraction device 2 at the machining tool opening 38.

Dust and debris may be generated through use of a machining tool such as a chisel, scaler, hammer, or the like. Typically, a chisel is connected to a machining device such as a rotary hammer. The rotary hammer, or machining device, reciprocates the chisel, or machining tool, with percussive blows which are used to break apart tile, concrete, brick, stone, flooring, walls, or the like. This action generates a great deal of dust and debris. The machining tool may be loaded into the debris extraction device 2 prior to attachment with the machining device by sliding the shank 25 (see FIG. 3 for example) of the machining tool into the machining tool opening 38 on the head 11 of the suction end 10. The shank 25 of the machining tool may be pushed up into the body 4 and exit the sleeve 6. Once the shank 25 exits the sleeve 6, the exposed end of the shank 25 may be attached to the machining device. This assembly locates the debris extraction device 2 between the head of the machining tool and the machining device. The port openings 12 are therefore located in close proximity to the location where debris and dust is generated.

When removing debris and dust, a suction device such as a vacuum may be connected to the extraction end 8 of the debris extraction device 2. Preferably, a flexible hose is used for this connection and a quick connect 30 may be used to quickly couple and decouple the hose from the extraction end 8. Once a suction power is provided to the extraction end 8, a negative air pressure is created all around the suction end 10 of the debris extraction device 2. The negative pressure forms as a result of port openings 12 that are formed on the head 11. In order to simplify manufacturability, the head 11 is formed with a polygonal surface. The overall goal is to simply provide a head 11 with a broad surface area to cover multiple directions with port openings 12. Each port opening 12 provides a path for the negative air pressure generated by the suction device to remove dust and debris. Dust and debris may also be suctioned in by any open pace in the machining tool opening 38 that is not occupied by the machining tool. Additionally, any other shape for the head 11 may also be used. Also, any number of port openings 12 may be used.

The debris extraction device 2 includes a shroud 16 that is attached to the head 11 of the suction end 10 with removable fasteners 18. The shroud 16 may be permanently affixed to the head 11, but preferably is removable and replaceable as this area is prone to damage from the rigors of use. During normal operation, chunks of concrete, tile, stone, and the like get lodged between the machining tool and the head 11 which can scratch or gouge the head 11. The head 11 may also be used as a blunt object to strike pieces of tile, concrete, or the like. The shroud 16 therefore acts as a serviceable bumper for the debris extraction device 2 to prolong its use. The shroud 16 also allows a degree of adjustability to the size of the machining tool opening 38 as the shroud 16 may be adjusted and the fasteners 18 tightened once the shroud 16 is in the optimal location.

Figure 3:
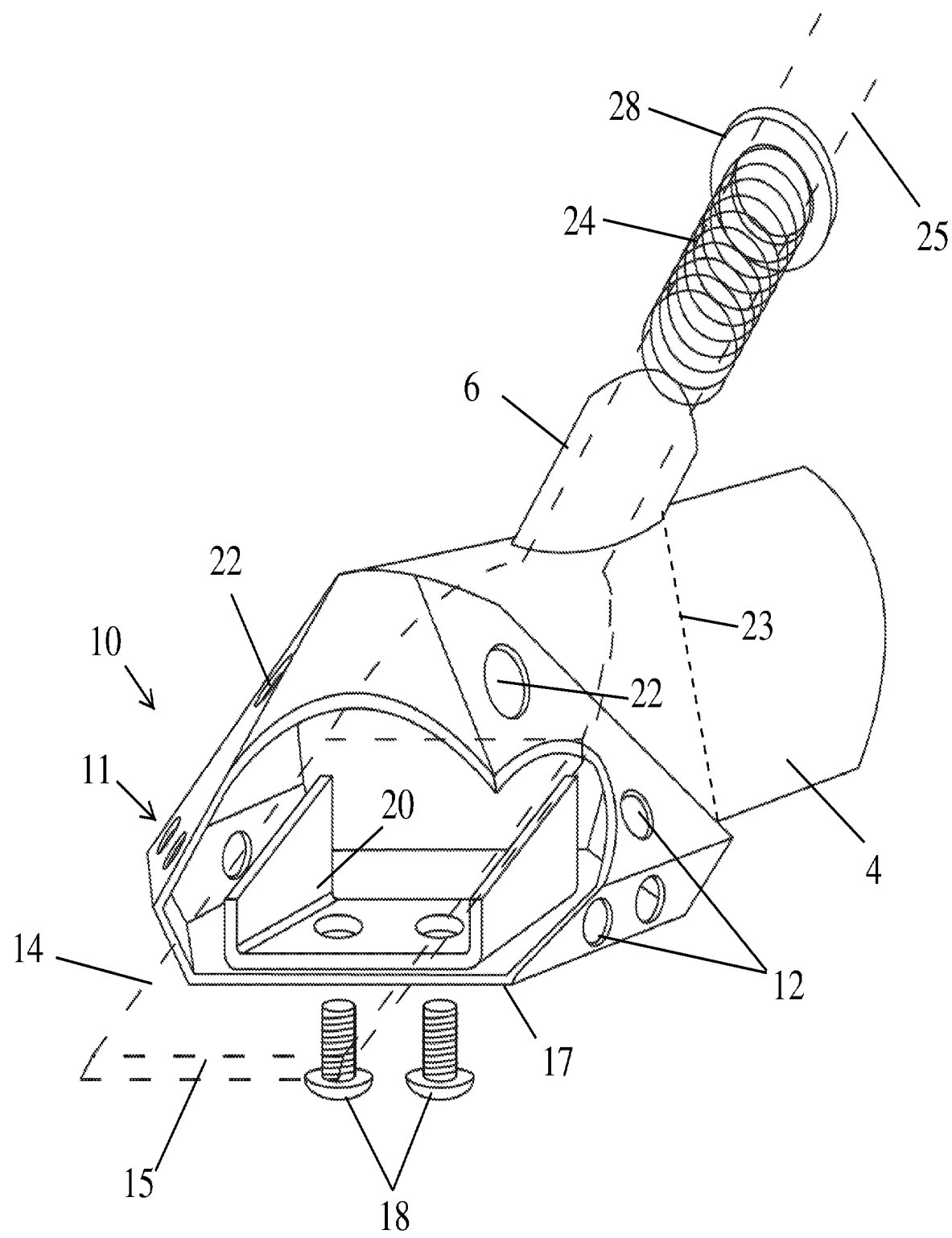
FIG. 3 shows a front perspective view of the debris extraction device of FIG. 1, with a portion of the device removed for clarity.
Figure 4:
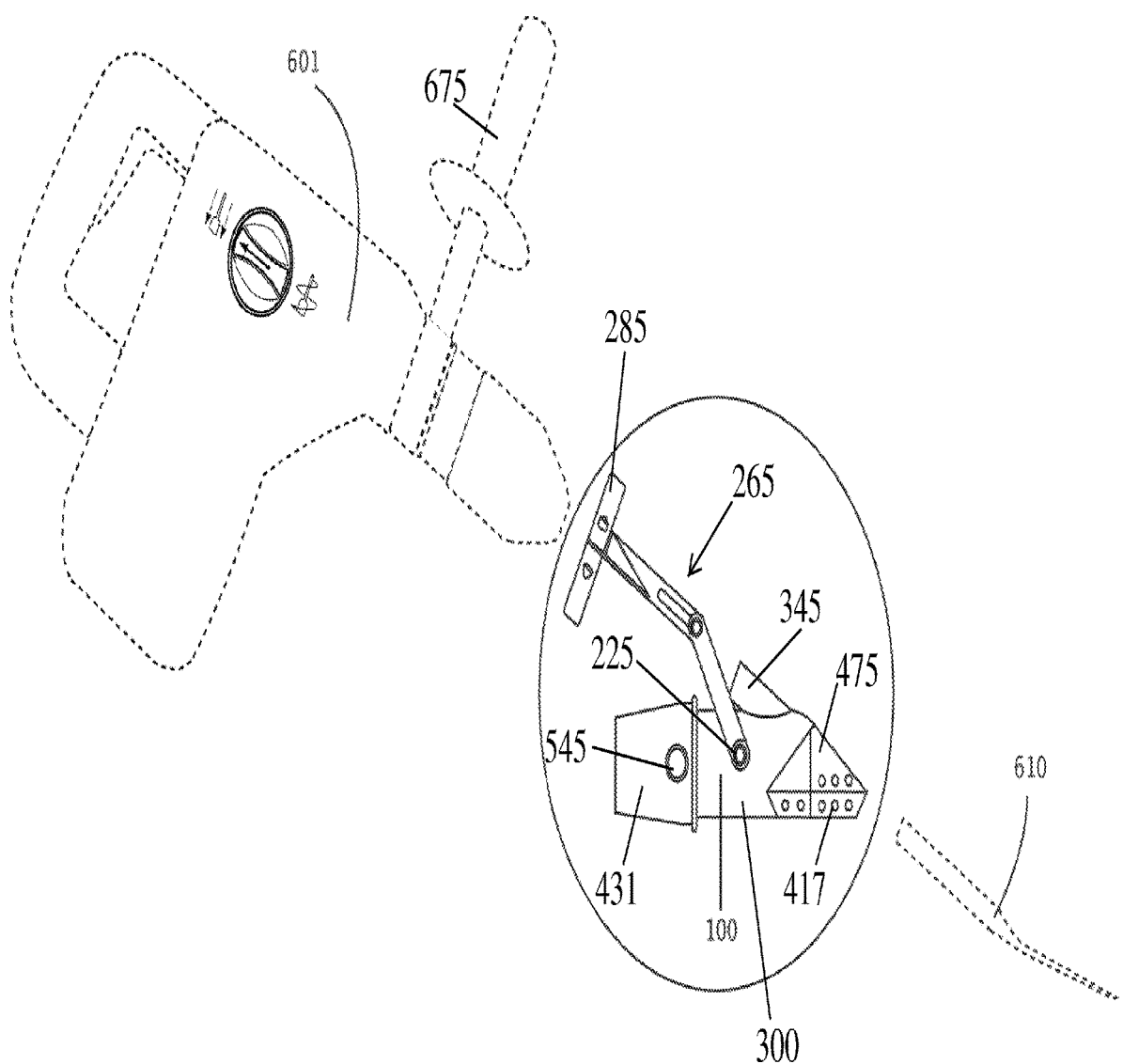
FIG. 4 shows a perspective view of a debris extraction device according to another embodiment of the invention.
Figure 5:
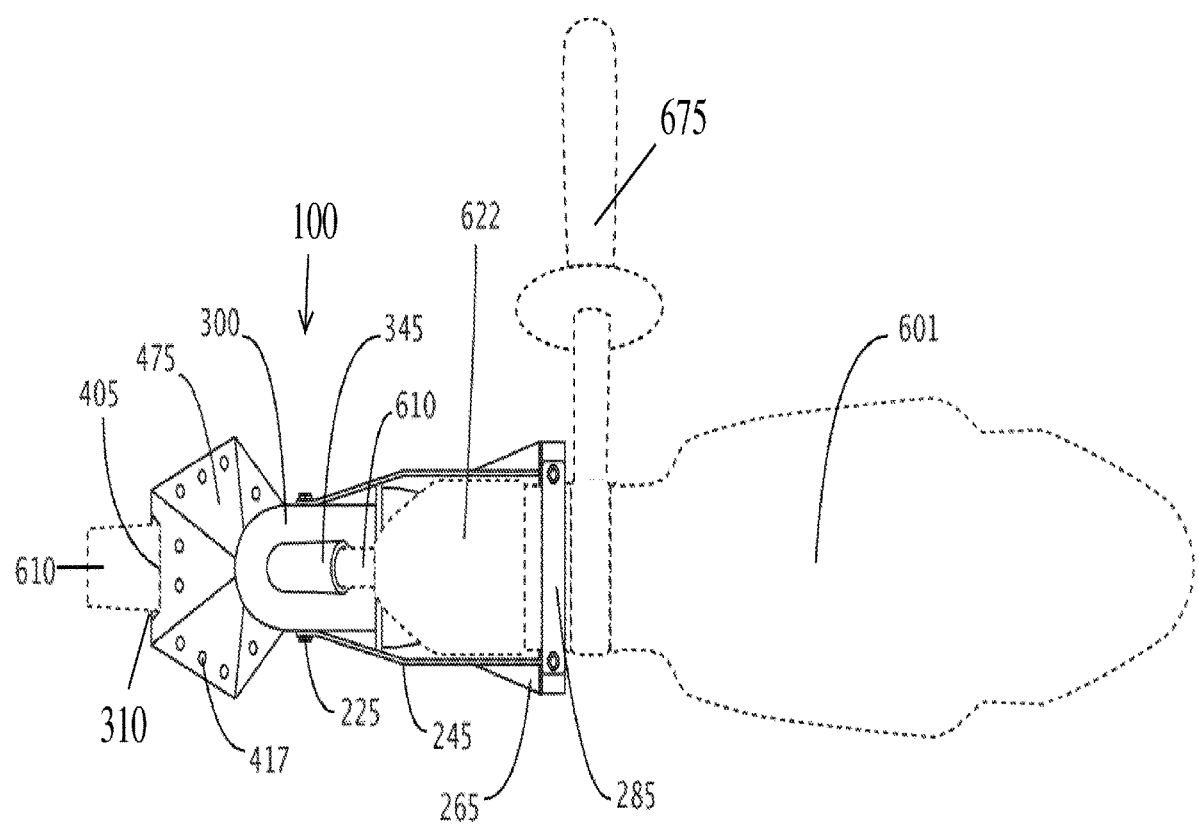
FIG. 5 shows a top view of the debris extraction device of FIG. 4.

FIG. 3 provides a view of the debris extraction device 2 with the shroud 16 removed. The hollow interior of the body 4 may also be seen. A support webbing 23 may also be included within the hollow interior of the body 4 that joins the sleeve 6 to the opposing side of the body 4. The shroud mount holes 22, which receive the fasteners 18, are exposed. The machining tool 14 is shown in phantom, dashed lines. Within the hollow head 11 is a wear plate 20 affixed to the base 17 with removable fasteners 18. Much like the shroud 16, the wear plate 20 acts as a replaceable bumper for the debris extraction device 2. The wear plate 20 may contact the chisel head 15 as it is reciprocated by the machining device. Similarly, debris causes abrasion on the wear plate as it is sucked into the suction end 10 through the machining tool opening 38 (see FIGS. 1 and 2 for example). This contact wears down the wear plate 20 over time. The wear plate can also act as a guide and provides a surface for the chisel head 15 to glide along on top of as it is reciprocated by the machining device. The wear plate 20 is therefore a dual-purpose feature, i.e. a guide and a replaceable wear item.

Also shown in FIG. 3 are a spring 24 and a stop 28. The spring 24 works with the stop 28 to maintain a force between the sleeve 6 and the machining tool device. This constant force acts as a buffer against hard blows dealt to the head 11 of the debris extraction device 2 during use. During a hard blow, the spring 24 can contract to absorb the blow and prevent the full force from being transferred to either the debris extraction device 2 or the machining device. The constant force applied to the sleeve 6 by the spring 24 also helps prevent the debris extraction device 2 from moving or vibrating during use. The spring 24 and the force it maintains on the debris extraction device 2 allows the debris extraction device 2 to free-float on the shank 25 of the machining tool 14. This free-floating action eliminates the need to structurally secure the debris extraction device 2 to the machining device. Instead of affixing the debris extraction device 2 to the machining device, it simply floats on the shank 25 of the machining tool 14 and maintains its location due to the constant force of the spring 24. The stop 28 simply prevents the spring 24 from contacting the machining device and provides a uniform, smooth surface for the spring 24 to contact.

Figure 8:
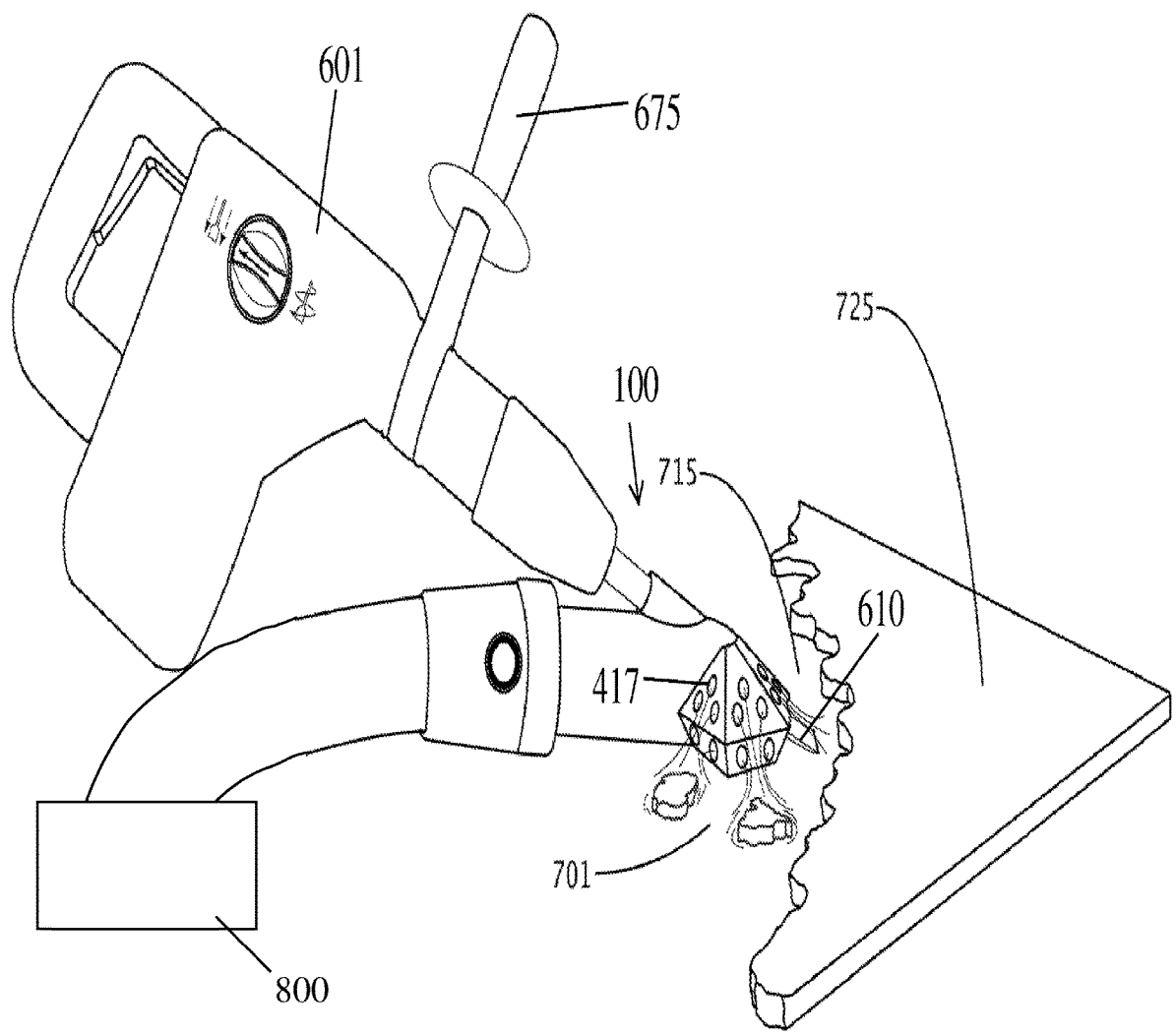
FIG. 8 shows a side view of the debris extraction device in use.

Looking now at an alternative embodiment of the invention, FIGS. 4-8 show an embodiment that incorporates a bracket 265 to affix the debris extraction device 100 to a machining device 601. The debris extraction device 100 includes multiple angled faces 475 with port openings 417 are joined in a multi-faceted shape. These angled faces 475 connect to the body 300 of the debris extraction device 100 and enclose the front of the chamber. The suction end 405 has a machining tool opening 310 where the machining tool 610 slides through. The machining tool opening 310 and port openings 417 also provide a 360 degree intake to collect dust from the impact the machining tool 610 makes against the material being removed. The machining tool 610 exits the body 300 of the debris extraction device 100 through a sleeve 345 and allows reciprocating movement of the machining tool 610 with the machining device 601. The sleeve 345 allows the multi-faceted angled faces 475 to be remote and separated from the machining device 601 thereby keeping dust out of the machining device 601 body and also contains the movement of the debris extraction device 100 during use. In any embodiment, the port openings 417 on the angled faces 475 allow the debris extraction device 100 to extract dust and debris 701 from multiple directions, including to the sides and behind the machining tool 610, at the same time, (see FIG. 8 for example). Also shown in FIG. 8 is the debris extraction device 100 in use where the machining tool 610 is breaking up tile 725 into smaller debris 701 and the debris extraction device 100 is suctioning the debris 701 through the port openings 417 with the use of a suction device 800.

Connecting to the body 300 of the debris extraction device 100 is a bracket 265 that stabilizes and keeps the debris extraction device 100 from rotating about the machining device 601 during use. The bracket connection 225 to the body 300 allows adjustment of the debris extraction device 100 to guide the machining tool 610 into multiple styles of power tools, this plays a part in making the debris extraction device 100 adapt to fit multiple brands of power tools/chipping hammers. The middle of the bracket 245 provides a connection point where the length can be adjusted between the body 300 and the collar clamp connection 285. This length adjustment provides further adjustment to fit multiple power tools/chipping hammers. The end of the bracket 265, where it meets with the collar clamp 285, is reinforced to limit movement of the bracket. The bracket end 265 attaches to the collar clamp 285 thereby holding the bracket assembly firmly in place.

Figure 6:
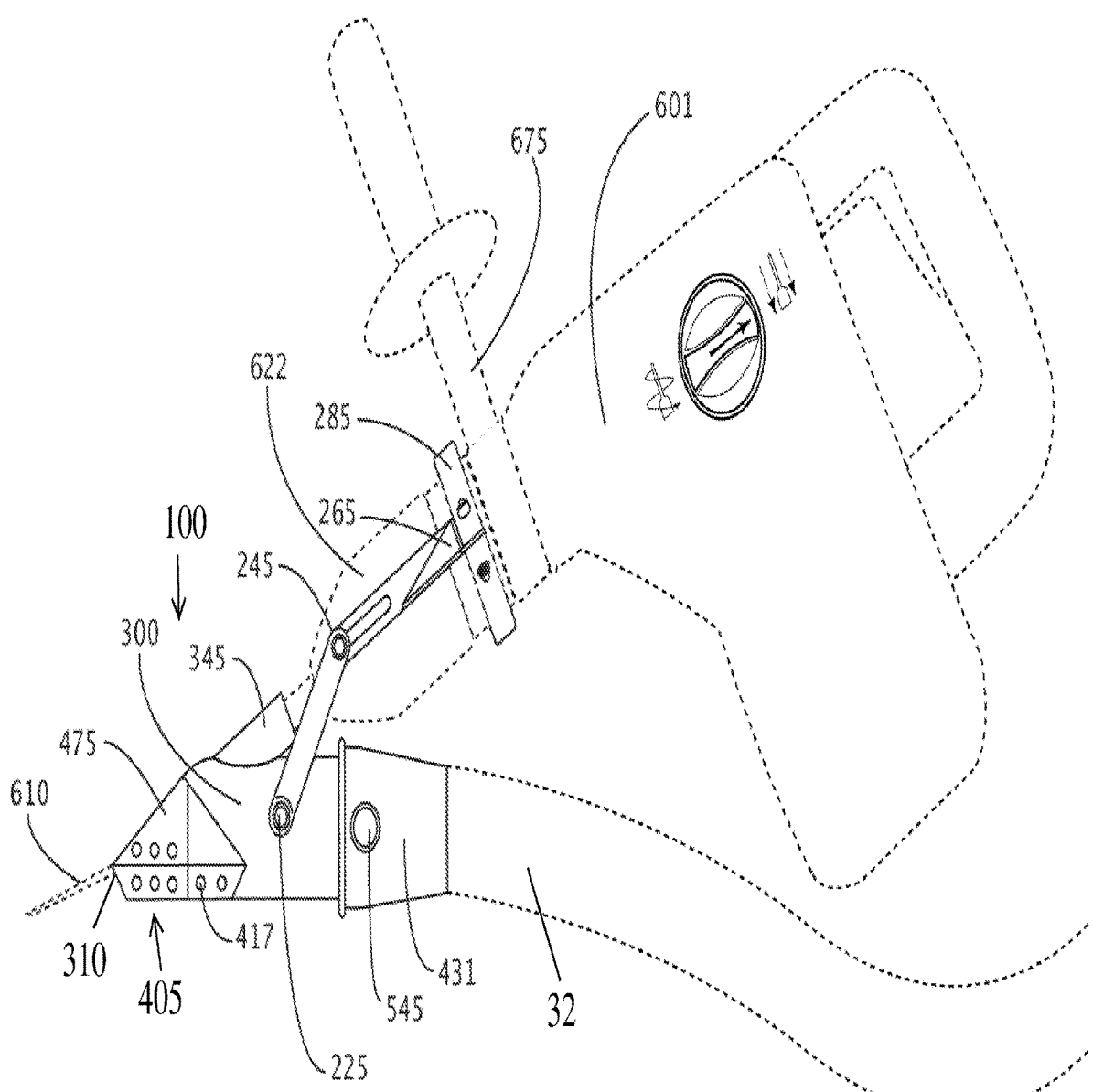
FIG. 6 shows a side view of the debris extraction device of FIG. 4.
Figure 7:
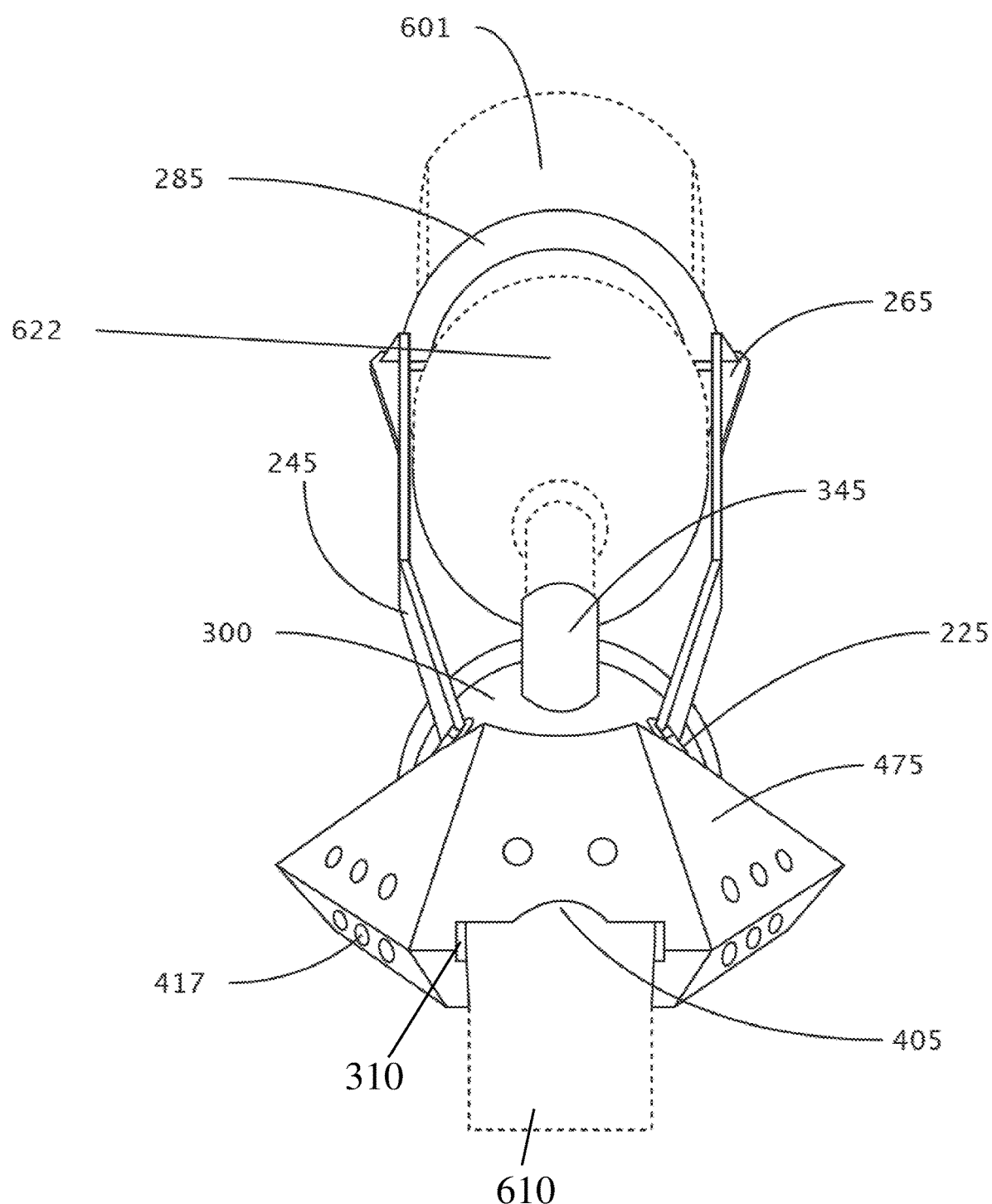
FIG. 7 shows a front view of the debris extraction device of FIG. 4.

The body 300 is entirely hollow thereby preventing debris from becoming stuck there within and requiring removal of the debris extraction device 100 to dislodge the debris. The suction hose 300, best shown in FIG. 6, is locked in place with a simple quick disconnect release 545 at the extraction end 431. There is sufficient clearance between the suction hose 32, extraction end 430 and the machining device 601 to allow disconnection of the suction hose 32 without removal of the debris extraction device 100 from the machining device 601.

It is foreseeable that any embodiment of the invention may be made out of any combination of materials such as metals, alloys, plastics, resins, wood, or the like.

It is also foreseeable that the debris extraction device 100 may include a collar clamp 285 can have other features, like quick release levers and thumb screws. The thickness of the collar clamp 285 can vary in depth, height, width on both the inside and outside diameter. The collar clamp 285 may also be made from any type of material.

In some embodiments of the invention the collar clamp 285 may include a handle attached to the body 300 that takes place of the originally equipped handle 675 (see FIG. 6 for example). This handle can be of varying size and shape.

In some embodiments of the device the elbow of the bracket connection 245 may have multiple groves for predetermined power tool settings.

In any embodiment, the user's line of sight to the machining tool 610 and suction end 405 is not obstructed by the debris extraction device 100. This is due to the unique angle of the sleeve 345 to the body 300. This angle allows for unobstructed view and allows for proper operation of the machining device 601.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

I claim:

1. A debris extraction device for attachment to a machining device comprising:
    a body with an internal cavity extending along a central axis of the body;
    a sleeve attached to the body at an angle other than normal to the central axis configured to receive a machining tool;

an extraction end on the body configured for attachment to a suction device in fluid communication with the internal cavity;

a suction end on the body opposite the extraction end with a plurality of suction port openings;

wherein the machining tool extends through the sleeve and into the central axis of the body thereby exiting the body at the suction end; and wherein the debris extraction device further comprises a wear plate attached to an interior of the suction end, within the internal cavity, with removable fasteners, and wherein the wear plate is capable of contacting the machining tool as the machining tool moves within the sleeve during operation.

2. The debris extraction device for attachment to a machining device according to claim 1, further comprising:

a shroud attached to an exterior of the suction end with removable fasteners, wherein the shroud is capable of contacting the machining tool as the machining tool moves within the sleeve during operation.

3. The debris extraction device for attachment to a machining device according to claim 1, wherein the debris extraction device free floats on a shank of the machining tool and otherwise not connected to the machining device.

4. The debris extraction device for attachment to a machining device according to claim 3, further comprising a webbing joining the sleeve to the internal cavity within the body.

5. The debris extraction device for attachment to a machining device according to claim 4, wherein the sleeve extends into the internal cavity and extends from the body, outside of the internal cavity.

6. The debris extraction device for attachment to a machining device according to claim 1, further comprising a spring between the body and the machining device, configured to maintain the body at a predetermined distance apart from the machining device.

7. The debris extraction device for attachment to a machining device according to claim 1, further comprising:

a quick-connect fastener on the extraction end configured for attachment to the suction device;

a suction hose with a quick-connect fastener configured for attachment to the quick-connect fastener on the extraction end; and wherein the suction hose extends from the debris extraction device below the machining device, thereby providing an unobstructed view of the machining tool, when the machining device is in in use on a horizontal, level floor.

8. A debris extraction device for attachment to a machining device comprising:

a body with an internal cavity extending along a central axis of the body;

a sleeve attached to the body at an angle other than normal to the central axis configured to receive a shank of a machining tool;

an extraction end on the body configured for attachment to a suction device in fluid communication with the internal cavity;

a suction end on the body opposite the extraction end with a plurality of suction port openings;

a spring surrounding the shank of the machining tool between the sleeve and the machining device;

wherein the machining tool extends through the sleeve and into the central axis of the body thereby exiting the body at the suction end; and wherein the debris extraction device further comprises a wear plate attached to the suction end, within the internal cavity, with removable fasteners, and wherein the wear plate is capable of contacting the machining tool as the machining tool moves within the sleeve during operation.

9. The debris extraction device for attachment to a machining device according to claim 8, further comprising:

a shroud attached to an exterior of the suction end with removable fasteners, wherein the shroud includes a plurality of apertures configured to remove an airborne debris when the suction device is activated.

10. The debris extraction device for attachment to a machining device according to claim 9, wherein the shroud is configured to wear with repeated contact with the debris and also configured to be replaceable.

11. The debris extraction device for attachment to a machining device according to claim 8, wherein the debris extraction device free floats on a shank of the machining tool and is otherwise not connected to the machining device.

12. The debris extraction device for attachment to a machining device according to claim 11, further comprising a webbing joining the sleeve to an opposing side of the internal cavity within the body.

13. The debris extraction device for attachment to a machining device according to claim 12, wherein the sleeve extends away from and into the internal cavity.

14. The debris extraction device for attachment to a machining device according to claim 8, further comprising:

a quick-connect fastener on the extraction end configured for attachment to the suction device;

a suction hose with a quick-connect fastener configured for attachment to the quick-connect fastener on the extraction end; and wherein the suction hose extends from the debris extraction device below the machining device, thereby providing an unobstructed view of the machining tool, when the machining device is in in use on a horizontal, level floor.

15. The debris extraction device for attachment to a machining device according to claim 8, further comprising a stop washer between the spring and the machining device.

* * * * *